Figure 1:
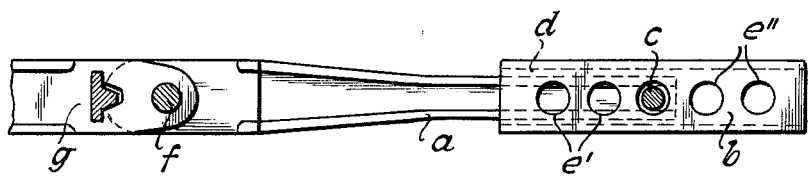

INVENTOR
Karl M. Groetschel
by Malcolm W. Fraser
attorney

United States Patent Office

3,216,168
Patented Nov. 9, 1965

---

3,216,168
CANTILEVER BAR COMPRISING AN END PORTION ADAPTED FOR SECUREMENT
Karl Maria Groetschel, 3–5 Schutzenbahn, Bochum, Westphalia, Germany
Filed June 5, 1961, Ser. No. 114,848
Claims priority, application Germany, June 11, 1960, G 29,852
3 Claims. (Cl. 52—632)

This invention relates to supports to be used in long wall mining and has for its object lagging irons to be fore-poled in cantilevered arrangement from another lagging iron or support which is itself supported by a prop or the like.

When such bars are subjected to stresses occurring in the conditions in which they are used, for example, the pressure of the roof, they transmit these stresses to the clamp which connects them to the supported part of the support system and which, unless it is specially reinforced with consequent increased expenditure, forms the weakest point of the complete system and therefore is most liable to damage, particularly if unforeseen high stresses occur.

It has therefore already been proposed to incorporate resilient elements in the connecting clamp, and in particular to provide a resilient construction for the replaceable locking element which holds the bar cantilever-fashion at a greater or lesser angle.

This necessitates replacement of any clamp part which becomes unserviceable in the event of damage.

The invention obviates any risk of damage to the clamp and hence eliminates the above disadvantages, by forming one or, if required, a plurality of weak points in the bar forwardly of the clamp, and before any overloading of a clamp part occurs the said weak point or points yield, preferably in such manner that the bar first undergoes elastic and then plastic deformation at that point. This avoids any transmission of excess stresses to the clamp.

The bar is a rule only slightly bent so that there is nothing to prevent it from being re-used, its function being in no way impaired.

If, as is preferably the case, the bar is made symmetrical with respect to its longitudinal axis in manner known per se, the bent bar after being turned through 180° for further use may be re-straightened by the stresses which then act in the opposite direction, and this means that its useful life is greatly extended without it being necessary to transport the apparatus to a repair shop located overground.

Bars constructed in the manner described in principle hereinabove may be used with particular advantage in combination with a support stand to which theye are pivotally connected with a permanent connection and together with which they are advanced, because the units thus formed from the stand and the bar remain operational for a long time without any need for repair. In the event of faults made in operating the bars, for example if the bars when used in this way are at an insufficient downward angle during the re-setting of the advanced stand and if they are extended in that position by the stand, they are particularly liable to the aforementioned stresses because as soon as the top edge of the bar abuts the roof because the angle in which the bar is fixed on the rearward bar is too steep, a stress occurs which acts on the longest lever arm.

Since a weak point is provided in the bar, the problem of securing the protection of the clamp in respect of these stresses is solved in a fundamentally much more advantageous way than, for example, is afforded by the construction known per se of a cantilevered bar in the form of a leaf spring which permits only elastic deformations and breaks when a certain stress is exceeded.

The basic principle of the invention may be embodied by giving a bar made in one piece a narrowed region, and also by incorporating a replaceable weaker region in a bar which, in that case, will consist of a plurality of parts.

In further development of the fundamental principle of the invention, the danger arising therefrom that the top edge of the front end of the bar abuts against the roof because the angle which the bar forms with the supporting bar following in backward direction is too steep may be avoided by fitting onto the front end of the bar an elongated element which is pivotable about a transverse axis or on a cradle with respect to the bar body, and which, when the bar is set at an angle against the roof, automatically assumes the position corresponding to the roof, i.e., bears snugly against the roof. This part which, as it were, is pivotal after the style of a weighbeam and of which the top surface bearing against the roof is preferably widened considerably with respect to the bar itself, at the same time advantageously compensates the difference in height between the area adjacent the connection of the bar with the rearward following supported bar and the region which is situated forwardly thereof. This enables locking means of conventional type to be used for mounting such bars e.g. on a supporting pillar or chock, without it being necessary to use special models.

The pivotal movement of the element in the form of a weighbeam is advantageously limited, preferably so as to be adjustable, more particularly in order to prevent the said element from swinging down to such an extent as to jeopardise safety in cases in which the roof has considerable uneven regions.

When appropriately constructed the pivotal element also offers the possibility of extending or shortening the bar simply by re-location or displacement of said element. It may also be changed for an element of a different length.

The drawings illustrate a number of examples of embodiment of bars according to the invention, although the invention is in no way restricted to these embodiments.

FIGURE 1 shows a first embodiment of the new bar, namely a bar which is symmetrical with respect to its longitudinal axis and the weak region of which is formed by a constriction at $a$ obtained by gradual symmetrical reduction of the profile.

Beyond this constriction, a part $b$ of a box section is fitted on to the end of the bar and is pivotal about a pin $c$ which passes through the side walls of the said box-section and the bar section.

Reference $d$ denotes the clearance between the boundary surfaces of the bar section and the box section, said clearance limiting the pivotal movement about the pin $c$ and having a large or small value as required.

This illustration also shows the bores $e'$, $e''$, etc., which enable the box section part $b$ to be fitted in different positions in order to lengthen or shorten the bar and which at the same time desirably reduce the weight of the box section part $b$.

By means of a clamp $f$ of conventional construction the bar is connected, by a locking element which, according to the example of embodiment, is formed by a sliding wedge, to the supported bar $g$ which is preferably carried by a support stand.

Figure 2:
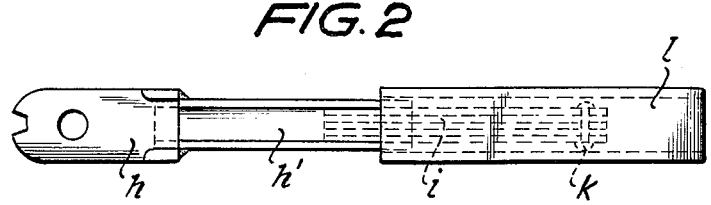

FIGURE 2 shows another embodiment of the new bar in which the weakened region $h'$ is formed by a hollow element which is welded into the region $h$ forming the clamp part and which preferably consists of a box-section part and in the cavity of which is inserted a set of springs $i$ which is loosely held together by a bolt $k$ and which extends inside the box-section element $l$ which is thus pivotal with a restricted degree of movement in relation to the actual bar. In this case the elastic resilience of the weak point has been shifted to the set of springs $i$ and the plastic resilience is given by the part $h'$.

Figure 3:
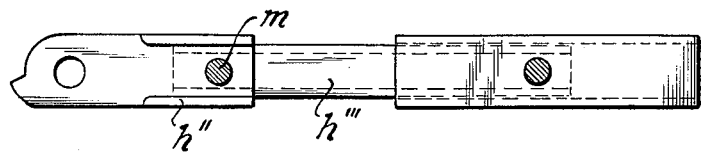

FIGURE 3 shows the possibility of connecting the weakened part $h'''$ to the clamp element $h''$ in such manner as to be replaceable, for example by means of a pin $m$, the element pivotal in the same manner as a scale-beam being constructed in similar manner to FIGURE 1. This intermediate part which is constricted in comparison with the adjoining part gives a reduced region which, particularly when the new bar is used as described in a paired arrangement cantilevered from a supporting pillar or chock, is available to support lagging, for example a lagging mat, which, connected permanently to the two bars carrying it, may also extend over the adjacent stands, i.e., forms a roof lagging extending over shorter or longer parts of the coal-face length and which is jointly moved when the stands are advanced.

The bar illustrated in FIGURE 3 is of unsymmetrical construction according to one possible embodiment. This is possible in the case of a replaceable weakened part the length of which may vary, because only this symmetrical part has to be turned through 180° for the purpose of re-straightening the bar.

Figure 4:
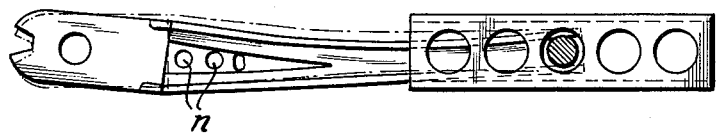

FIGURE 4 is a view corresponding to FIGURE 1 and shows only the operation of the intentional weak point, the solid lines showing the contours of the bent bar which is turned through 180° for re-use, while the broken lines show the normal contours of the non-bent bar. This figure also shows additional relieving holes $n$ in the initial region of weakened part, these holes being intended to compensate for tolerances.

The invention is naturally not restricted to the embodiments described in detal hereinabove nor to the simultaneous use of all the steps described. In particular, the invention also covers the use of the weak point without the pivoted head part and, on the other hand, the use of the latter without a weak point.

I claim:
1. A cantilever support bar comprising a first part adapted for securement and containing at least one transverse aperture therein, said first part including a weakened region; a second part having a hollow box-like cross-section containing at least one transverse aperture therein, said second part having a wide supporting surface; and means for pivotally interconnecting said first and second parts, said means including a pivot pin passing through registering apertures of said first and said second parts.

2. The invention defined in claim 1 including means providing longitudinal adjustment between said first and second parts.

3. A cantilever support bar comprising a first section of box-like cross-section adapted for securement, said first section including a weakened region; a second section of hollow box-like cross-section, said second section being wider than said first section for supporting a structue to be supported; and leaf spring means having opposite end portions housed in said first and second sections respectively, said leaf spring means pivotally connecting said first and second sections.

References Cited by the Examiner
UNITED STATES PATENTS

| 211,392 | 1/79 | Fairbanks | 189—34 |
| 1,259,206 | 5/18 | Bliss | 189—34 |
| 1,415,091 | 5/22 | Gauthier | 189—34 X |
| 1,693,344 | 11/28 | Morgan | 61—45.2 |
| 2,079,073 | 5/37 | Knoll. | |
| 2,174,340 | 9/39 | Werner | 189—36 |
| 2,969,249 | 1/61 | Fox | 287—99 |
| 2,991,097 | 7/61 | Vanwersch et al. | 287—99 |
| 3,091,088 | 5/63 | Vanwersch et al. | 61—45.1 |

FOREIGN PATENTS 1,047,146  12/58  Germany.

HARRISON R. MOSELEY, *Primary Examiner.*
JOEL REZNEK, *Examiner.*